(12) United States Patent
Blomqvist

(10) Patent No.: US 9,894,366 B2
(45) Date of Patent: Feb. 13, 2018

(54) VARIANT AND BUFFER HANDLING FOR ADAPTIVE BITRATE STREAMING

(71) Applicant: ARRIS Enterprises LLC, Suwanee, GA (US)

(72) Inventor: Mattias Blomqvist, Linkoping (SE)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/417,276

(22) Filed: Jan. 27, 2017

(65) Prior Publication Data

US 2017/0223361 A1   Aug. 3, 2017

Related U.S. Application Data

(60) Provisional application No. 62/287,953, filed on Jan. 28, 2016.

(51) Int. Cl.

| | |
|---|---|
| *H04N 7/173* | (2011.01) |
| *H04N 19/15* | (2014.01) |
| *H04N 19/423* | (2014.01) |
| *H04N 21/234* | (2011.01) |
| *H04N 21/24* | (2011.01) |
| *H04N 21/432* | (2011.01) |
| *H04N 21/433* | (2011.01) |

(Continued)

(52) U.S. Cl.
CPC ........... *H04N 19/15* (2014.11); *H04N 19/423* (2014.11); *H04N 21/23406* (2013.01); *H04N 21/2401* (2013.01); *H04N 21/4325* (2013.01); *H04N 21/4333* (2013.01); *H04N 21/44004* (2013.01); *H04N 21/44008* (2013.01); *H04N 21/8456* (2013.01); *H04N 21/8547* (2013.01)

(58) Field of Classification Search
CPC ....... H04N 21/44004; H04N 21/44008; H04N 21/8456; H04N 21/4325; H04N 21/2401; H04N 21/23406; H04N 21/8547
USPC ......................................... 725/93, 94, 96, 98
See application file for complete search history.

(56) References Cited

U.S. PATENT DOCUMENTS 7,647,614 B2 * 1/2010 Krikorian ......... H04L 29/06027
725/110
2012/0179834 A1    7/2012 Van Der Schaar et al.
(Continued)

FOREIGN PATENT DOCUMENTS

| DE | 10-2008-020807 A1 | 10/2009 |
|---|---|---|
| WO | 2011/011724 A1 | 1/2011 |
| WO | 2011/139305 A1 | 11/2011 |

OTHER PUBLICATIONS

PCT Search Report & Written Opinion, RE: Application No. PCT/US2017/015222, dated May 4, 2017.

*Primary Examiner* — Pankaj Kumar
*Assistant Examiner* — Sahar Baig
(74) *Attorney, Agent, or Firm* — Thomas A. Ward

(57) ABSTRACT

A method is provided to manage playback of adaptive bitrate streaming video using using a stall time delay. The method includes pausing playback of a segment of a variant when a playback point reaches a download point, marking a stall time that marks a point in time in the segment at which playback was paused, determining a remaining playback time, determining a remaining download time, selecting an offset time, determining a wait time, determining a resume time, and waiting to resume playback at least until the download point reaches the resume time.

17 Claims, 8 Drawing Sheets

| | | |
|---|---|---|
| 502 | Stall Time (ST) | Time at Which Playback Point 202 Reached Download Point 204 and Playback Paused |
| 702 | Remaining Playback Time (RPT) | Time of Segment's Endpoint - ST |
| 704 | Remaining Download Time (RDT) | $\dfrac{\text{Amount of Video Data Between ST and End of Segment}}{\text{Current Data Transfer Rate}}$ |
| 706 | Offset Time (OT) | $0 <= OT <= RPT$ |
| 708 | Wait Time (WT) | $RDT - RPT + OT$ |
| 710 | Resume Time (RT) | $ST + WT \left(\dfrac{RPT}{RDT}\right)$ |

(51) Int. Cl.
  *H04N 21/44* (2011.01)
  *H04N 21/845* (2011.01)
  *H04N 21/8547* (2011.01)

(56) References Cited

U.S. PATENT DOCUMENTS

| | | | |
|---|---|---|---|
| 2013/0042015 A1* | 2/2013 | Begen | H04N 19/46 |
| | | | 709/231 |
| 2013/0044801 A1* | 2/2013 | Cote | H04N 19/146 |
| | | | 375/240.01 |
| 2014/0143439 A1 | 5/2014 | Ramamurthy | |
| 2016/0105728 A1* | 4/2016 | Schmidmer | H04N 21/44008 |
| | | | 725/110 |
| 2016/0118086 A1* | 4/2016 | Bowen | G11B 27/3036 |
| | | | 386/241 |
| 2016/0119657 A1* | 4/2016 | Sun | H04N 21/23406 |
| | | | 725/94 |
| 2017/0094336 A1* | 3/2017 | Agarwal | H04N 21/64738 |
| 2017/0257647 A1* | 9/2017 | Iguchi | H04N 21/231 |

\* cited by examiner

| | | |
|---|---|---|
| 502 | Stall Time (ST) | Time at Which Playback Point 202 Reached Download Point 204 and Playback Paused |
| 702 | Remaining Playback Time (RPT) | Time of Segment's Endpoint - ST |
| 704 | Remaining Download Time (RDT) | $\dfrac{\text{Amount of Video Data Between ST and End of Segment}}{\text{Current Data Transfer Rate}}$ |
| 706 | Offset Time (OT) | $0 <= OT <= RPT$ |
| 708 | Wait Time (WT) | RDT - RPT + OT |
| 710 | Resume Time (RT) | $ST + WT \left(\dfrac{RPT}{RDT}\right)$ |

FIG. 7

VARIANT AND BUFFER HANDLING FOR ADAPTIVE BITRATE STREAMING

CLAIM OF PRIORITY

This Application claims priority under 35 U.S.C. § 119(e) from earlier filed U.S. Provisional Application Ser. No. 62/287,953, filed Jan. 28, 2016, which is hereby incorporated by reference.

TECHNICAL FIELD

The present disclosure relates to the field of digital video streaming, particularly a method of minimizing the number pauses in playback due to buffering.

BACKGROUND

Streaming live or prerecorded video to client devices such as set-top boxes, computers, smartphones, mobile devices, tablet computers, gaming consoles, and other devices over networks such as the internet has become increasingly popular. Delivery of such video commonly relies on adaptive bitrate streaming technologies such as HTTP Live Streaming (HLS), HTTP Dynamic Streaming (HDS), Smooth Streaming, and MPEG-DASH.

Adaptive bitrate streams are often segmented such that client devices can transition between different variants of a video stream at segment boundaries, depending on factors such as network conditions and the receiving client device's processing capacity. For example, a video can be encoded at a high quality level using a high bitrate, at a medium quality level using a medium bitrate, and at a low quality level using a low bitrate. Each alternative variant of the video stream can be listed on a playlist such that the client devices can request segments from the most appropriate variant for current conditions. A client device that initially requested segments from a high quality variant when it had sufficient available bandwidth for that variant can switch to requesting segments from a lower quality variant when the its available bandwidth decreases.

A client device generally has a buffer so that it can download video data into the buffer, and then extract the video data from the buffer for decoding and playback. When an entire segment is downloaded into a client device's buffer before playback reaches the end of that segment, the client device can request the next segment from the same or a different variant based on current network conditions. However, if network conditions deteriorate while the client device is downloading a segment such that the client device plays all the video data available in the buffer before additional video data can be downloaded, the client device can experience a buffer underrun.

In many adaptive bitrate streaming solutions a client device pauses video playback when it experiences a buffer underrun. The client device then waits until enough additional video data has been received in the buffer to allow it to begin playback again. If the client device waits too long to resume playback, the buffering delay can interrupt the viewing experience and frustrate users. However, if the client device does not wait long enough, or if network conditions change such that the client device plays back buffered video data of a segment faster than it downloads remaining portions of that segment, the client device can be forced to again pause playback and further buffer additional data within the same segment. Starting and stopping video playback for buffering multiple times within the same segment can be annoying for viewers and further deteriorate the viewing experience.

What is needed is a system for minimizing the number of playback pauses that occur due to buffer underruns within a single segment of an adaptive bitrate streaming variant, while also minimizing the length of such pauses.

SUMMARY

In one embodiment the present disclosure provides a method of managing playback of adaptive bitrate streaming video, the method comprising pausing playback of a segment of an adaptive bitrate streaming video variant at a client device when a playback point marking the current playback time in the segment reaches a download point marking the latest point in the segment downloaded into a buffer by the client device, marking a stall time that marks a point in time in the segment at which playback was paused, determining a remaining playback time from the stall time to the end of the segment, based on a data playback rate, determining a remaining download time to download the remainder of the segment based on a data transfer rate, selecting an offset time between zero and the remaining playback time, inclusive, determining a wait time by subtracting the remaining playback time from the remaining download time and adding the offset time, determining a resume time by adding to the stall time the wait time multiplied by the remaining playback time divided by the remaining download time, and waiting to resume playback at least until the download point reaches the resume time.

In another embodiment the present disclosure provides a method of managing playback of adaptive bitrate streaming video, the method comprising downloading video data from a segment of an adaptive bitrate streaming video variant at a data transfer rate from a media server into a buffer at a client device, advancing a download point at the data transfer rate, the download point marking the latest point in time in the segment for which video data has been received in the buffer, playing the segment with the client device by retrieving video data from the buffer; advancing a playback point at a data playback rate, the playback point marking the latest point in time in the segment that has been played on screen by the client device, pausing playback of the segment when the playback point reaches the download point and marking a stall time that marks the point in time in the segment at which playback was paused, determining a remaining playback time from the stall time to the end of the segment, based on the data playback rate, determining a remaining download time to download the remainder of the segment based on the data transfer rate, selecting an offset time between zero and the remaining playback time, inclusive, determining a wait time by subtracting the remaining playback time from the remaining download time and adding the offset time, determining a resume time by adding to the stall time the wait time multiplied by the remaining playback time divided by the remaining download time, and waiting to resume playback at least until the download point reaches the resume time.

In another embodiment the present disclosure provides a video streaming device, the video streaming device comprising a buffer configured to store video data from a segment of an adaptive bitrate streaming video variant, wherein the video data is received from a media server and added to the buffer at a data transfer rate, and a processor configured to advance a download point in memory at the data transfer rate, the download point marking the latest point in time in the segment for which video data has been received in the buffer, play the segment on a display by retrieving video data from the buffer at a data playback rate, decoding the video data, displaying the video data on the display, and advancing a playback point in memory at the data playback rate, the playback point marking the latest point in time in the segment that has been played on the display, pause playback of the segment when the playback point reaches the download point and marking a stall time in memory that marks the point in time in the segment at which playback was paused, determine a remaining playback time from the stall time to the end of the segment, based on the data playback rate, determine a remaining download time to download the remainder of the segment based on the data transfer rate, select an offset time between zero and the remaining playback time, inclusive, determine a wait time by subtracting the remaining playback time from the remaining download time and adding the offset time, determine a resume time by adding to the stall time the wait time multiplied by the remaining playback time divided by the remaining download time, and wait to resume playback at least until the download point reaches the resume time.

BRIEF DESCRIPTION OF THE DRAWINGS

Further details of the present invention are explained with the help of the attached drawings in which:

FIG. 7 depicts values calculated by a client device during execution of the method of FIG. 6.

DETAILED DESCRIPTION

Figure 1:
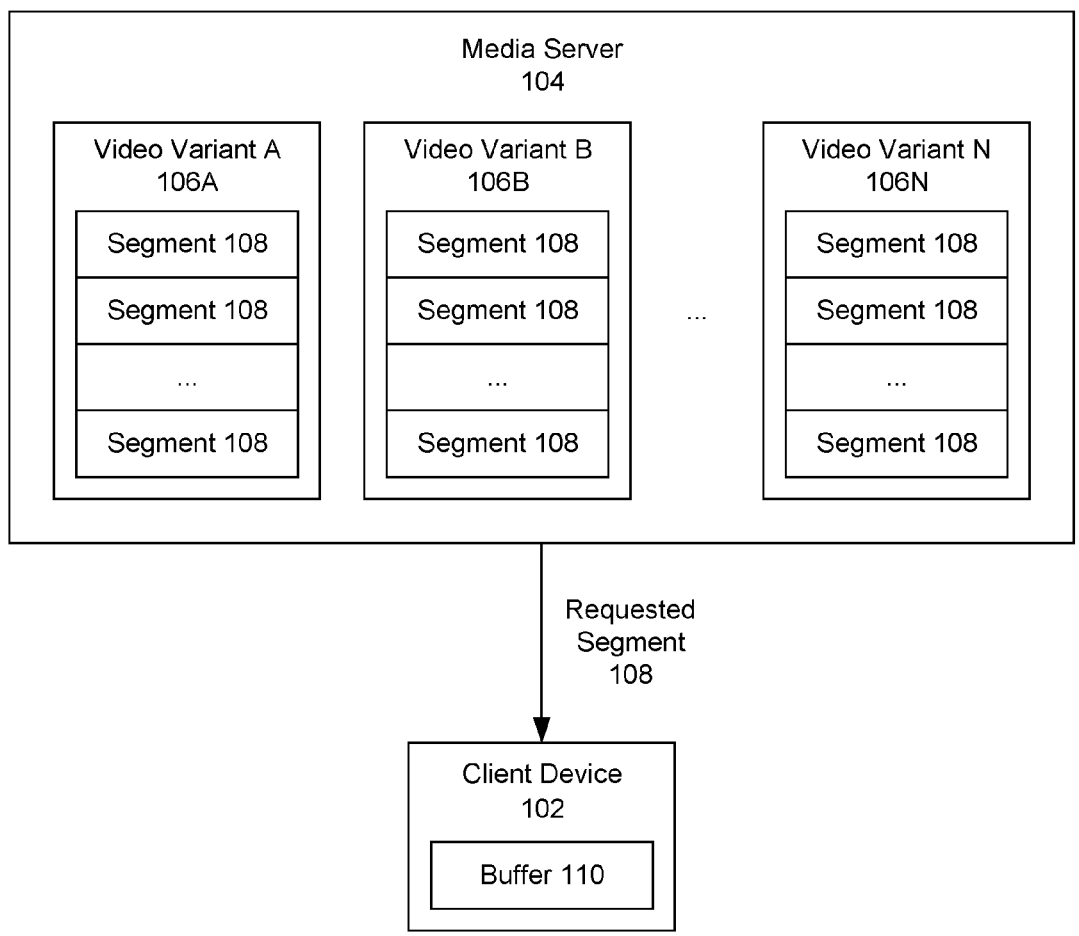
FIG. 1 depicts an embodiment of an adaptive bitrate streaming system in which a client device can receive a video stream from a media server.

FIG. 1 depicts an embodiment of an adaptive bitrate streaming system 100 in which a client device 102 can receive a data stream from a media server 104. The media server 104 can store one or more variants 106 of a piece of content. The piece of content can comprise video, audio, and/or other data. By way of a non-limiting example, the piece of content can be a video with visual and audible components, such as a movie, television show, video clip, or any other video. By way of another non-limiting example, the piece of content can be an audio stream. The media server 104 can deliver requested segments 108 of the variants 106 to the client device 102 over the internet or other network connection via adaptive bitrate streaming. While the description below describes variants 106 and segments 108 of a video, it should be understood that in other embodiments the piece of content can be audio streams and/or other types of segmented data that can be delivered via adaptive bitrate streaming.

The client device 102 can be a set-top box, cable box, computer, smartphone, mobile device, tablet computer, gaming console, or any other device configured to request, receive, and play back video via adaptive bitrate streaming. The client device 102 can have one or more processors, data storage systems or memory, and/or communication links or interfaces.

The media server 104 can be a server or other network element that stores, processes, and/or transfers segments 108 of variants 106 of a video. By way of non-limiting examples, the media server 104 can be an Internet Protocol television (IPTV) server, over-the-top (OTT) server, or any other type of server or network element. The media server 104 can have one or more processors, data storage systems or memory, and/or communication links or interfaces.

The media server 104 can deliver video to the client device 102 via adaptive bitrate streaming, such as HTTP Live Streaming (HLS), HTTP Dynamic Streaming (HDS), Smooth Streaming, MPEG-DASH streaming, or any other type of adaptive bitrate streaming. In some embodiments, HTTP (Hypertext Transfer Protocol) can be used as a content delivery mechanism to transport segments 108 from the media server 104 to a client device 102. In other embodiments, other transport mechanisms or protocols such as RTP (Real-time Transport Protocol) or RTSP (Real Time Streaming Protocol) can be used to deliver segments 108 from the media server 104 to the client device 102.

Each variant 106 of a video available on the media server 104 can be a digitally encoded version of that video that is encoded at a different quality level. By way of a non-limiting example, each variant 106 of the video can be encoded at a different bitrate. The variants 106 can encoded with a video coding format and/or compression scheme such as MPEG-4 AVC (H.264), MPEG-2, HEVC, VP9, or any other format.

Each of the variants 106 can be divided into segments 108. Segments 108 can be time slices of a variant 106. By way of a non-limiting example, in some embodiments the segments 108 can be 1 to 30 second chunks of the variants 106. Information about the variants 106 and/or their segments 108, such as their bitrate and URLs where individual segments 108 of the variants 106 can be requested, can be listed on playlists or other manifests that are available to client devices 102. As such, client devices 102 can use playlists to request particular segments 108 from particular variants 106.

The boundaries between corresponding segments 108 can be synchronized in each variant 106, and the segments 108 can be encoded such that each segment 108 can be independently decodable by client devices 102. As such, the client device 102 can transition between different variants 106 at the boundaries between segments 108. By way of a non-limiting example, when a client device 102 that has been requesting segments 108 from a high-bitrate variant 106 experiences network congestion, it can request subsequent segments 108 from lower-bitrate variants 106 until network conditions improve enough to return to the high-bitrate variant 106.

The client device 102 can have software, firmware, and/or hardware through which it can request, decode, and play back segments 108 from the media server 104 using adaptive bitrate streaming. By way of a non-limiting example, a client device 102 can have an HLS player application through which it can play HLS adaptive bitrate video streams for users. The client device 102 can store full and/or partially downloaded segments 108 in a memory location such as a buffer 110. The client device 102 can decode video data stored in the buffer 110 for playback. In some embodiments video data that has been decoded and played back can be removed from the buffer 110 to clear space. In other embodiments decoded video data can remain in the buffer 110 for a period of time following playback before it is deleted from memory.

Figure 2:
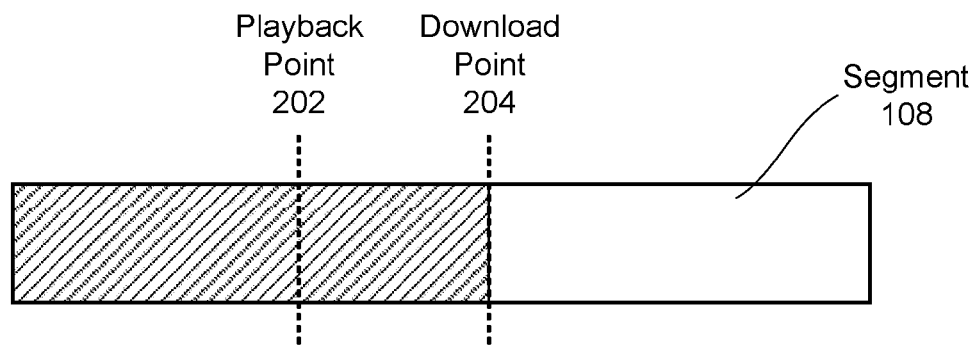
FIG. 2 depicts an embodiment of a video segment that has been partially downloaded into a client device's buffer.
Figure 3:
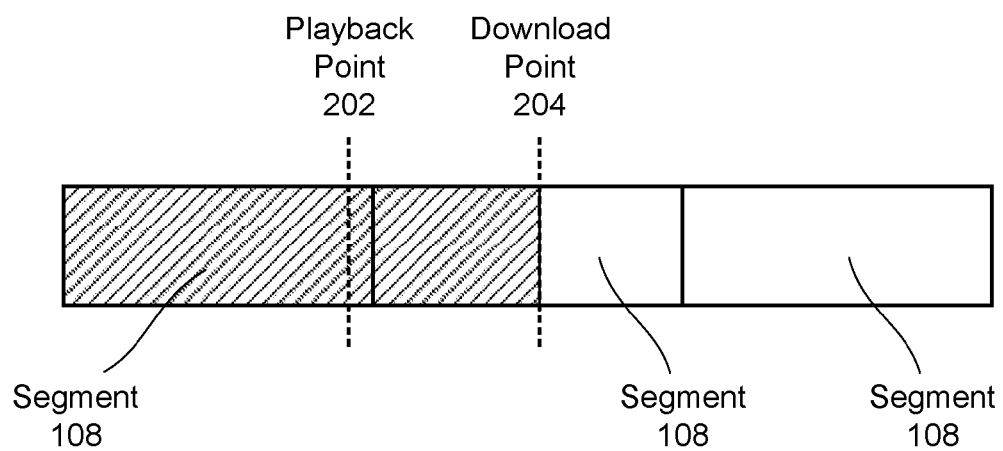
FIG. 3 depicts a series of video segments being downloaded into a client device's buffer.

FIG. 2 depicts an embodiment of a segment 108 that has been partially downloaded into a client device's buffer 110, while FIG. 3 depicts a series of segments 108 being downloaded into a client device's buffer 110. As the client device 102 receives segments 108, decodes them, and plays them back, the client device 102 can track a playback point 202 and a download point 204 within the video.

The playback point 202 can mark a time in the video corresponding to the client device's current playback position. By way of a non-limiting example, in some embodiments the playback point 202 can be a timestamp corresponding to a frame currently being displayed on screen by the client device 102. The playback point 202 can advance at a data playback rate, the rate at which video data is decoded and displayed on screen by the client device 102. By way of a non-limiting example, the data playback rate can be a rate at which video data is extracted from the buffer 110 to decode and display the video at 30 frames per second or any other frame rate. In some embodiments the data playback rate can be different for segments 108 of different variants 106. By way of a non-limiting example, the data playback rate for a high bitrate variant 106 can be higher than the data playback rate for a low bitrate variant 106.

The download point 204 can mark a time in the video corresponding to the latest point in the video for which video data has been received and stored in the client device's buffer 110. The download point 204 can advance at a data transfer rate, the rate at which video data is received by the client device 102 from the media server 104. The playback point 202 and download point 204 can be in the same segment as shown in FIG. 2, or be in different segments as shown in FIG. 3. By way of a non-limiting example, the client device 102 can be downloading a later segment 108 while playing an earlier segment 108, such that the download point 204 is located in a later segment 108 than the playback point 202.

Figure 4A:
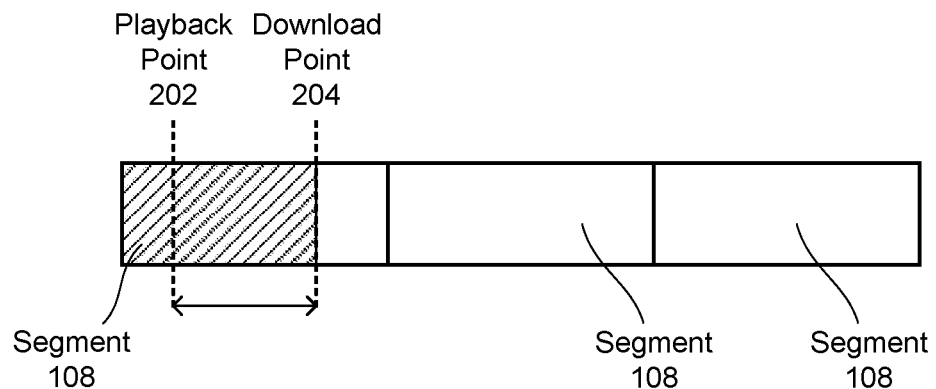
FIGS. 4A-4C depict the distance between a playback point and a download point changing as a data transfer rate changes.
Figure 4B:
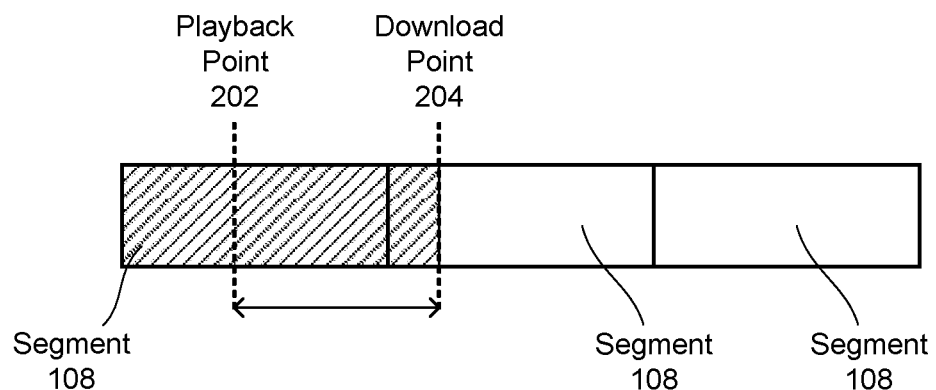
Figure 4C:
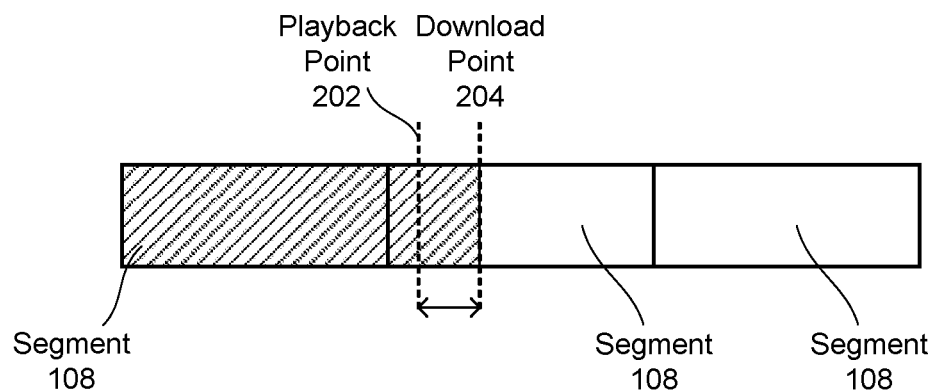

FIGS. 4A-4C depict the distance between the playback point 202 and download point 204 changing as the data transfer rate changes. Although the data playback rate for a segment 108 can be substantially constant when sufficient video data is present in the buffer 110, the data transfer rate can vary depending on available network bandwidth, the media server's output rate, the media server's response time, and/or other factors. As such, the distance between the playback point 202 and the download point 204 can be variable as shown in FIGS. 4A-4C. When the client device 102 receives video data faster than it is playing it back, the distance between the playback point 202 and the download point 204 can increase and the amount of unplayed video data stored in the buffer 110 can grow. When the client device 102 receives video data slower than it is playing it back, the distance between the playback point 202 and the download point 204 can decrease and the amount of unplayed video data stored in the buffer 110 can shrink.

By way of a non-limiting example, client devices 102 often request segments 108 of the highest quality variant 106 that can be downloaded at the data transfer rate as it is measured when the request is made, because viewers generally prefer watching higher quality video. However, because the data transfer rate is variable, it can decrease after a segment 108 has been requested and the client device 102 is downloading that segment. If it decreases enough, the playback point 202 can advance more quickly than the download point 204 and the gap between them can narrow.

The data playback rate can be greater than the data transfer rate for long enough that the playback point 202 risks catching up to the download point 204 in the same segment 108. In some cases that situation can be temporary, and the data transfer rate can increase such that the download point 204 advances more quickly than the playback point 202 and the gap between them widens. If the data playback rate remains greater than the data transfer rate but the download point 204 reaches the end of the segment 108 before the playback point 202 catches up to the download point 204, the client device 102 can attempt to keep the download point 204 ahead of the playback point 202 by requesting the next one or more segments 108 from a variant 106 with a lower bitrate such that they can be downloaded more quickly.

Figure 5:
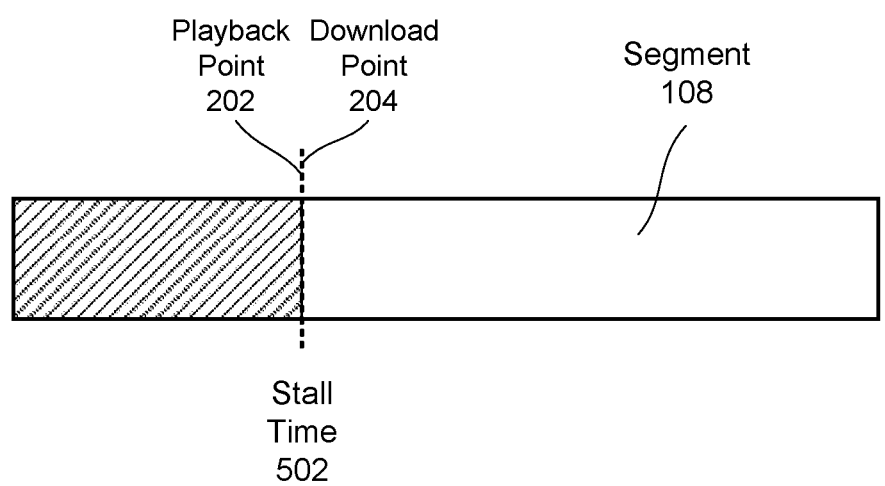
FIG. 5 depicts a playback point catching up to the download point, causing video playback to be paused at a stall time.

However, as shown in FIG. 5, in some cases the data transfer rate can be low enough for long enough that the playback point 202 catches up to the download point 204 within the same segment 108. In these situations the client device 102 can experience a buffer underrun because no unplayed video data is available in the buffer 110. By way of a non-limiting example, network conditions can deteriorate such that the data transfer rate is much lower than the data playback rate and the playback point 202 reaches the download point 204. When the playback point 202 reaches the download point 204 and no further video data is available in the buffer 110, the client device 102 can pause playback and cease advancement of the playback point 202 due to the buffer underrun. The client device 102 can mark the time in the video at which playback was paused as the stall time 502. The client device 102 can continue downloading video data to the buffer 110 and advancing the download point 204 while playback is paused. The client device 102 can use the method shown in FIG. 6 to calculate a period of time to wait before resuming playback.

Figure 6:
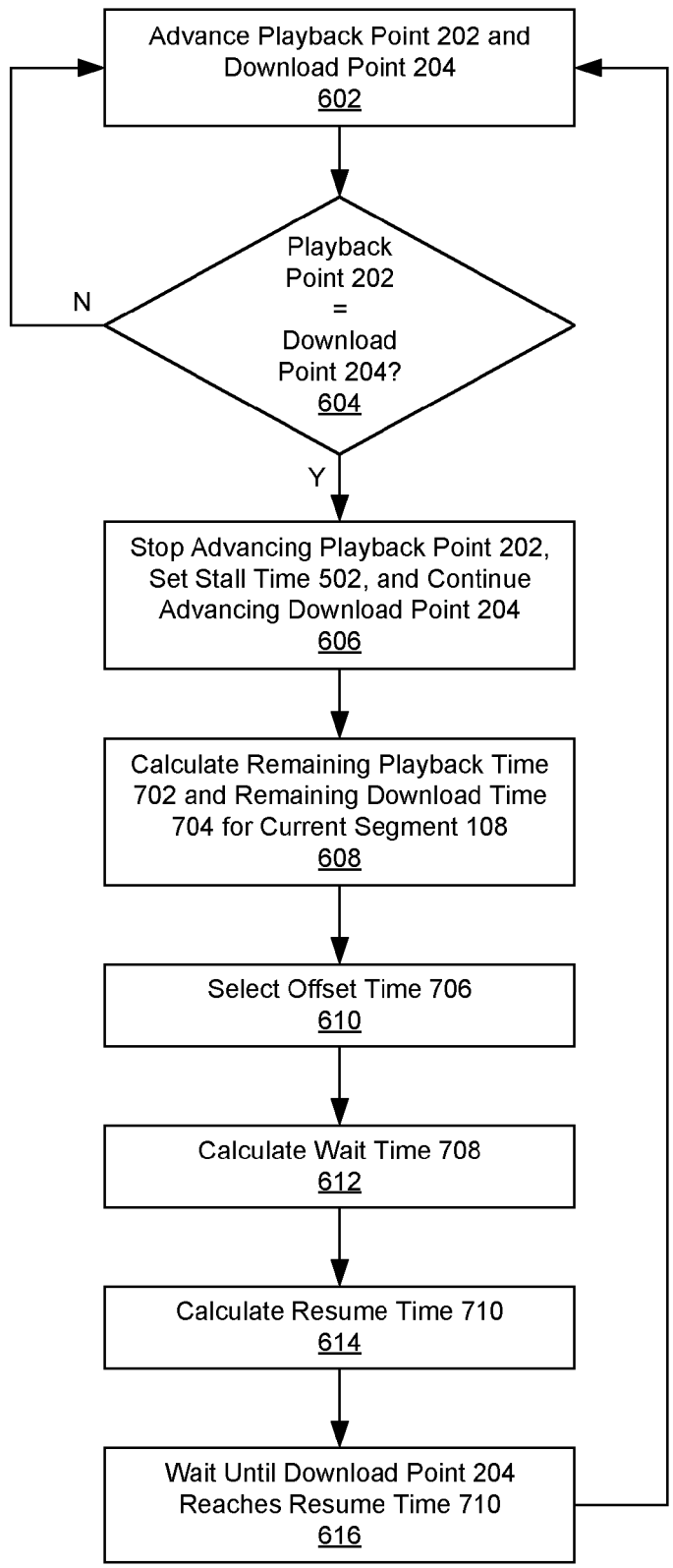
FIG. 6 depicts a flow chart of a method for pausing video playback at a client device and calculating a period of time to wait before resuming playback.

FIG. 6 depicts a flow chart of a method for pausing video playback at a client device 102 and calculating a period of time to wait before resuming playback. FIG. 7 depicts values calculated by the client device 102 during execution of the method of FIG. 6.

At step 602, the client device 102 can advance the playback point 202 at the data playback rate and advance the download point 204 at the data transfer rate as the client device 102 receives, decodes, and plays back segments 108.

At step 604, the client device 102 can determine whether the playback point 202 has reached the download point 204. If the playback point 202 has reached the download point 204 within a segment 108 the client device 102 can move to step 606. However, if the download point 204 is ahead of the playback point 202, the client device 102 can return to step 602 and continue playing back the video and advancing the playback point 202 while also continuing to download the current segment 108.

If the client device 102 is able to download a complete segment 108 during steps 602 and 604, it can request the next segment 108 from a variant 106 based on the current and/or recent data transfer rate. By way of a non-limiting example, if the data transfer rate was lower than the data playback rate for enough time that the distance between the playback point 202 and download point 204 narrowed beyond a predefined amount or percentage, the client device 102 can request the next segment 108 from a lower bitrate variant 106 such that the download point 204 can advance more quickly. After requesting the next segment 108, the client device 102 can return to step 602 to play that segment 108 and advance the playback point 202 and download point 204.

At step 606, if the playback point 202 has reached the download point 204 within a segment 108, the client device 102 can pause video playback and mark the stall time 502. The client device can continue downloading the current segment 108 and advancing the download point 204 while video playback is paused.

At step 608, the client device 102 can calculate a remaining playback time 702 for the current segment 108. The remaining playback time 702 can be the time it would take to play the remaining unplayed portion of the current segment 108. As shown in FIG. 7, the remaining playback time 702 can be calculated as the time of the segment's endpoint minus the stall time 502.

During step 608 the client device 102 can also calculate a remaining download time 704 for the current segment 108. The remaining download time 704 can be the time it would take at the current data transfer rate to download the remaining portion of the current segment 108 beyond the stall time 502. As shown in FIG. 7, the remaining download time 704 can be calculated by dividing the amount of video data between the end of the segment 108 and the stall time 502 by the current data transfer rate.

Figure 8:
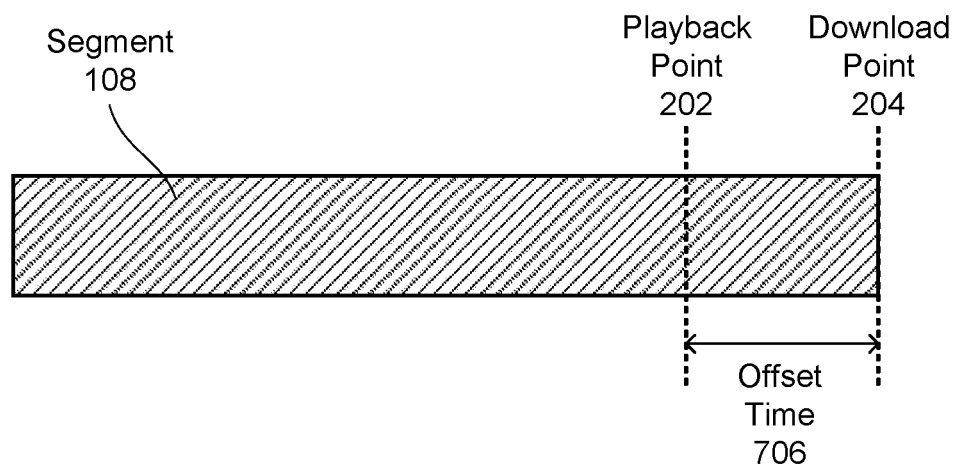
FIG. 8 depicts an offset time selected as a minimum amount of time between a playback point and a download point when the download point reaches the end of a segment.

At step 610, the client device 102 can select an offset time 706. As shown in FIG. 7, the offset time 706 can be selected as a minimum amount of time that should be present between the playback point 202 and download point 204 when the download point 204 reaches the end of the segment 108 as shown in FIG. 8. The offset time 706 can be set to any value between zero and the remaining playback time 702, inclusive. By way of a non-limiting example, the offset time 706 can be selected as two seconds, such that two seconds of unplayed video data will be in the buffer 110 when the download point 204 reaches the end of the segment 108. The client device 102 can be set to use a lower offset time 706 when minimizing the length of playback pauses is prioritized, while it can be set to use a higher offset time 706 when ensuring uninterrupted playback once playback resumes is prioritized.

At step 612, the client device 102 can calculate a wait time 708. As shown in FIG. 7, the wait time 708 can be calculated as the remaining download time 704 minus the remaining playback time 702, plus the selected offset time 706.

At step 614, the client device 102 can calculate a resume time 710. As shown in FIG. 7, the resume time 710 can be calculated as the stall time 502 plus the wait time 708 multiplied by the remaining playback time 702 divided by the remaining download time 704.

Figure 9:
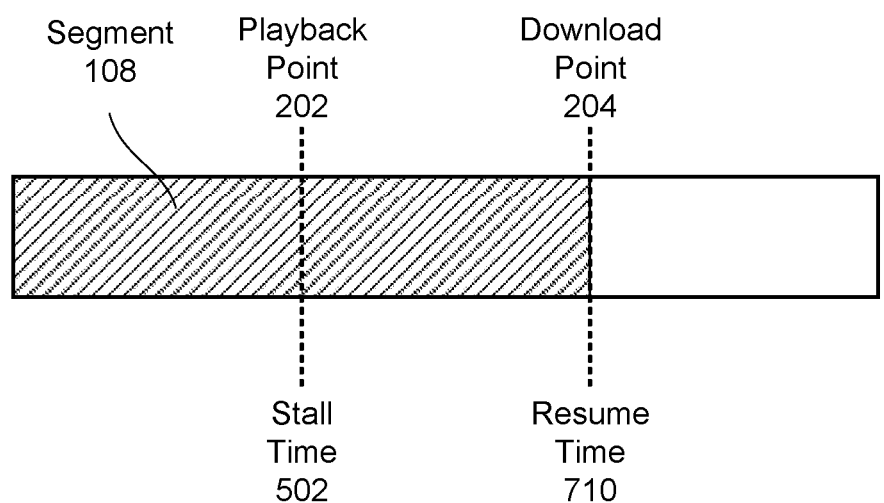
FIG. 9 depicts a download point reaching a resume time in a segment.

At step 616, the client device 102 can wait until the download point 204 has reached the resume time 710 as shown in FIG. 9. During this waiting period playback can remain paused, and the stall time 502 can remain unchanged. The duration of the waiting period until the download point 204 reaches the calculated resume time 710 can be substantially similar to the calculated wait time 708, however it can vary due to changes in the actual data transfer rate.

In some embodiments the client device 102 can resume playback when the download point 204 reaches the resume time 710 after step 616. In these embodiments the client device 102 can return to step 602 and continue advancing the playback point 202 and download point 204 from where they were when playback resumed. By taking the remaining playback time 702 and remaining download time 704 into account when calculating the resume time 710, the playback point 202 can be less likely to catch up to the download point 204 within the segment 108 after playback resumes once the download point 204 reaches the resume time 710. This can reduce the chances of beginning playback and then undergoing one or more additional pauses in playback during the same segment 108.

By way of a non-limiting example, if the segment 108 is 30 seconds long and the playback point 202 reaches the download point 204 20 seconds into the segment 108, the stall time 502 would be 20 seconds and the remaining playback time 702 would be 10 seconds. If the client device 102 calculates that it would take 15 seconds to download the remaining 10 seconds of video data at the current data transfer rate, the remaining download time 704 would be 15 seconds. If the client device 102 is set to use a 5 second offset time 706, at step 612 the client device 102 would calculate the wait time 708 as 10 seconds (15 seconds of remaining download time 704 minus 10 seconds of remaining playback time 702, plus 5 seconds of offset time 706). At step 614 the client device 102 would calculate the resume time 708 as 26.67 seconds (the stall time 502 of 20 seconds plus the wait time 708 of 10 seconds multiplied by 10 seconds of remaining playback time 702 divided by 15 seconds of remaining download time 704). At step 616, the client device 102 can wait until the download point 204 reaches 26.67 seconds. Based on the data transfer rate used to calculate the remaining download time 704, it can take approximately the wait time 708 of 10 seconds for the download point 204 to reach the resume time 710.

At this point in the example, based on the data transfer rate used earlier, the client device 102 would expect to take 5 more seconds to download the remaining 3.33 seconds of video data in the segment 108 beyond the resume time 710 into the buffer 110. As such, the client device 102 can safely resume playback from the 20 second stall time 502, because the client device 102 expects to be able to download the remaining data in the segment 108 in 5 seconds, while it will take 10 seconds to play back the rest of the segment 108. The difference between those times is the selected offset time 706.

Figure 10:
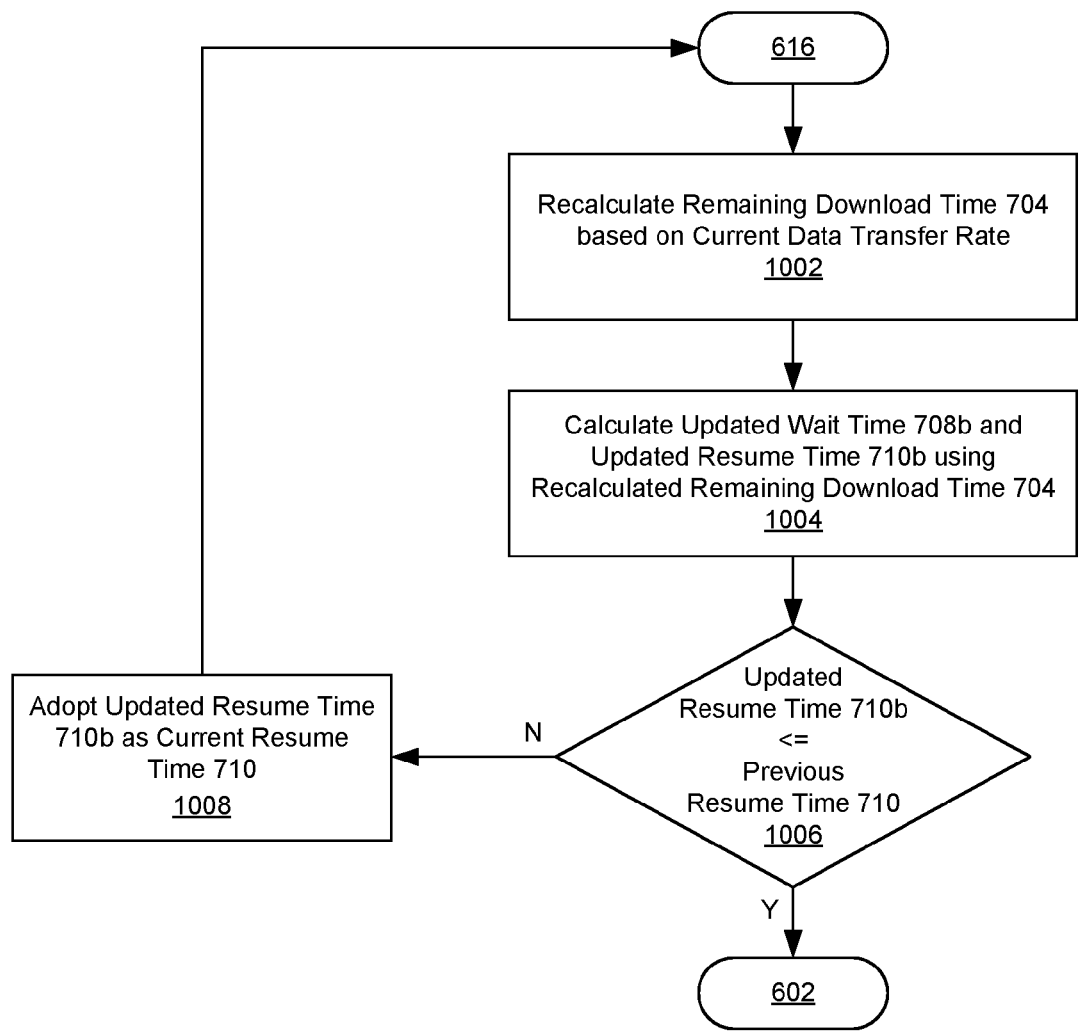
FIG. 10 depicts a flow chart of a method for determining whether to resume video playback or continue waiting once the download point reaches a calculated resume time.

In alternate embodiments, when the download point 204 reaches the resume time 710 after step 616, the client device 102 can perform additional checks based on the current data transfer rate before determining whether or not to resume playback. By way of a non-limiting example, the client device 102 can follow the steps shown in FIG. 10 after step 616 is complete and the download point 204 reaches the resume time 710 in order to take changes in the actual data transfer rate into account.

At step 1002, the client device 102 can recalculate the remaining download time 704 by calculating how long it would take at the current data transfer rate to download the portion of the segment 108 between the stall time 502 and the end of the segment 108, rather than the value of the data transfer rate as it was when the playback point 202 first reached the download point 204.

At step 1004, the client device 102 can calculate an updated wait time 708*b* and an updated resume time 710*b* using the recalculated remaining download time 704 found during step 1002. The updated wait time 708*b* and an updated resume time 710*b* can be calculated as described above with respect to steps 614 and 616, using updated values.

At step 1006, the client device 102 can determine whether the updated resume time 710*b* is earlier than or equal to the previous resume time 710 calculated during step 616. If the updated resume time 710*b* is earlier than or equal to the previous resume time 710, the client device 102 can resume playback directly and return to step 602.

However, if during step 1006 the client device 102 determines that the updated resume time 710*b* is later than the previous resume time 710 calculated during step 616, the client device 102 can adopt the updated resume time 710*b* as the current resume time 710 at step 1008. The client device can then return to step 616 to wait further until the download point 204 reaches the new resume time 710. When it does, it can again follow the steps of FIG. 10 to either wait further or resume playback. By taking changes in the current data transfer rate into account when calculating the updated resume time 710*b*, the client device 102 can further reduce the risk of resuming playback and then undergoing one or more additional pauses in playback during the same segment 108 due to deteriorated network conditions.

By way of a non-limiting example, as described in a different example, above the stall time 502 can have occurred at 20 seconds and the client device 102 can have calculated a 15 second remaining download time 704 based on the data transfer rate at the time the playback point 202 reached the download point 204. As described above, the client device 102 can calculate at a resume time 710 of 26.67 seconds based on these values. However, if when the download point 204 reaches 26.67 seconds the client device 102 finds that it would have taken 17 seconds to download the portion of the segment 108 between the stall time 502 and the end of the segment 108, instead of the originally calculated 15 seconds, the client device 102 can use 17 seconds as the recalculated remaining download time 704 at step 1002.

In this example, at step 1004 the client device 102 can calculate an updated wait time 708*b* of 12 seconds (17 seconds of recalculated remaining download time 704 minus 10 seconds of remaining playback time 702, plus 5 seconds of offset time 706). It can also calculate an updated resume time 710*b* of 27.06 seconds (the stall time 502 of 20 seconds plus the updated wait time 708*b* of 12 seconds multiplied by 10 seconds of remaining playback time 702 divided by 17 seconds of recalculated remaining download time 704). Because the updated resume time 710 of 27.06 seconds in this example was later than the original resume time 710 of 26.67 seconds, the client device 102 can continue pausing video playback until the download point 204 reaches the new resume time 710 of 27.06 seconds. At that point it can either resume playback or wait until yet another later resume time 710 calculated from a new value for the current data transfer rate.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

The invention claimed is:

1. A method of managing playback of adaptive bitrate streaming video, comprising:
    pausing playback of a segment of an adaptive bitrate streaming video variant at a client device when a playback point marking the current playback time in said segment reaches a download point marking the latest point in said segment downloaded into a buffer by said client device;
    marking a stall time that marks a point in time in said segment at which playback was paused;
    determining a remaining playback time from said stall time to the end of said segment, based on a data playback rate;
    determining a remaining download time to download the remainder of said segment based on a data transfer rate;
    selecting an offset time between zero and said remaining playback time, inclusive;
    determining a wait time by subtracting said remaining playback time from said remaining download time and adding said offset time;
    determining a resume time by adding to said stall time said wait time multiplied by said remaining playback time divided by said remaining download time; and
    waiting to resume playback at least until said download point reaches said resume time.

2. The method of claim 1, wherein said client device advanced said playback point at a data playback rate.

3. The method of claim 1, wherein said client device advanced said download point at a data transfer rate.

4. The method of claim 1, further comprising resuming playback of said segment with said client device immediately when said download point reaches said resume time.

5. The method of claim 1, further comprising:
    recalculating said remaining download time by calculating the time to download a portion of said segment between said stall time and the end of the segment at a new current value for said data transfer rate;
    calculating an updated wait time and an updated resume time based on the recalculated remaining download time;
    resuming playback of said segment immediately when said updated resume time is not later than said resume time; and
    continuing to pause playback of said segment until said updated resume time when said updated resume time is later than said resume time.

6. The method of claim 1, wherein said offset time represents a desired time gap between said playback said download point when it reaches the end of said segment.

7. The method of claim 1, further comprising requesting a subsequent segment from an adaptive bitrate streaming video variant at a bitrate suitable for said data transfer rate when said client device downloads the entirety of said segment before said playback point reaches said download point.

8. A method of managing playback of adaptive bitrate streaming video, comprising:
    downloading video data from a segment of an adaptive bitrate streaming video variant at a data transfer rate from a media server into a buffer at a client device;
    advancing a download point at said data transfer rate, said download point marking the latest point in time in said segment for which video data has been received in said buffer;
    playing said segment with said client device by retrieving video data from said buffer;
    advancing a playback point at a data playback rate, said playback point marking the latest point in time in said segment that has been played on screen by said client device;

pausing playback of said segment when said playback point reaches said download point and marking a stall time that marks the point in time in said segment at which playback was paused;

determining a remaining playback time from said stall time to the end of said segment, based on said data playback rate;

determining a remaining download time to download the remainder of said segment based on said data transfer rate;

selecting an offset time between zero and said remaining playback time, inclusive;

determining a wait time by subtracting said remaining playback time from said remaining download time and adding said offset time;

determining a resume time by adding to said stall time said wait time multiplied by said remaining playback time divided by said remaining download time;

and waiting to resume playback at least until said download point reaches said resume time.

9. The method of claim 8, further comprising resuming playback of said segment with said client device immediately when said download point reaches said resume time.

10. The method of claim 8, further comprising:

recalculating said remaining download time by calculating the time to download a portion of said segment between said stall time and the end of the segment at a new current value for said data transfer rate;

calculating an updated wait time and an updated resume time based on the recalculated remaining download time;

resuming playback of said segment immediately when said updated resume time is not later than said resume time; and continuing to pause playback of said segment until said updated resume time when said updated resume time is later than said resume time.

11. The method of claim 8, wherein said offset time represents a desired time gap between said playback said download point when it reaches the end of said segment.

12. The method of claim 8, further comprising requesting a subsequent segment from an adaptive bitrate streaming video variant at a bitrate suitable for said data transfer rate when said client device downloads the entirety of said segment before said playback point reaches said download point.

13. A video streaming device, comprising:

a buffer configured to store video data from a segment of an adaptive bitrate streaming video variant, wherein said video data is received from a media server and added to said buffer at a data transfer rate; and a processor configured to:

advance a download point in memory at said data transfer rate, said download point marking the latest point in time in said segment for which video data has been received in said buffer;

play said segment on a display by retrieving video data from said buffer at a data playback rate, decoding said video data, displaying said video data on said display, and advancing a playback point in memory at said data playback rate, said playback point marking the latest point in time in said segment that has been played on said display;

pause playback of said segment when said playback point reaches said download point and marking a stall time in memory that marks the point in time in said segment at which playback was paused;

determine a remaining playback time from said stall time to the end of said segment, based on said data playback rate;

determine a remaining download time to download the remainder of said segment based on said data transfer rate;

select an offset time between zero and said remaining playback time, inclusive;

determine a wait time by subtracting said remaining playback time from said remaining download time and adding said offset time;

determine a resume time by adding to said stall time said wait time multiplied by said remaining playback time divided by said remaining download time; and wait to resume playback at least until said download point reaches said resume time.

14. The video streaming device of claim 13, wherein said processor is further configured to resume playback of said segment immediately when said download point reaches said resume time.

15. The video streaming device of claim 13, wherein said processor is further configured to recalculate said remaining download time by calculating the time to download a portion of said segment between said stall time and the end of the segment at a new current value for said data transfer rate;

calculate an updated wait time and an updated resume time based on the recalculated remaining download time;

resume playback of said segment immediately when said updated resume time is not later than said resume time; and continue to pause playback of said segment until said updated resume time when said updated resume time is later than said resume time.

16. The video streaming device of claim 13, wherein said offset time represents a desired time gap between said playback said download point when it reaches the end of said segment.

17. The video streaming device of claim 13, wherein said processor is further configured to request a subsequent segment from an adaptive bitrate streaming video variant at a bitrate suitable for said data transfer rate when the entirety of said segment has been downloaded into said buffer before said playback point reaches said download point.

* * * * *